United States Patent
Stege et al.

[19]

[11] Patent Number: 6,062,485
[45] Date of Patent: May 16, 2000

[54] RADIANT HEATING SYSTEM RESET CONTROL

[75] Inventors: Daniel K. Stege, Wauwatosa, Wis.; Roger P. Michaud, Orrs Island, Me.

[73] Assignee: Erie Manufacturing Company, Milwaukee, Wis.

[21] Appl. No.: 09/064,438

[22] Filed: Apr. 22, 1998

[51] Int. Cl.[7] ................................................ G05D 23/00
[52] U.S. Cl. ........................................... 237/2 A; 237/8 R
[58] Field of Search ..................... 237/8 R, 8 C, 237/2 A

[56] References Cited

U.S. PATENT DOCUMENTS

| | | | |
|---|---|---|---|
| 3,100,621 | 8/1963 | Zeitlin | 251/214 |
| 3,152,785 | 10/1964 | Zeitlin | 251/133 |
| 3,421,691 | 1/1969 | Forbes | 236/9 |
| 4,708,287 | 11/1987 | De Wit | 237/8 R |
| 4,755,730 | 7/1988 | Sandelman et al. | 318/341 |
| 4,844,355 | 7/1989 | McKinley et al. | 237/8 |
| 5,042,431 | 8/1991 | Shprecher et al. | 122/448.3 |
| 5,056,712 | 10/1991 | Enck | 236/20 |
| 5,119,988 | 6/1992 | Fiedrich | 237/8 R |
| 5,337,955 | 8/1994 | Burd | 236/91 |
| 5,556,027 | 9/1996 | Fiedrich | 237/8 C |
| 5,586,449 | 12/1996 | Krist | 62/179 |
| 5,622,221 | 4/1997 | Genga, Jr. et al. | 165/208 |
| 5,779,143 | 7/1998 | Michaud et al. | 237/8 R |

OTHER PUBLICATIONS

"Mixing Control 365", Tekmar—Data Brochure No. D365, Jan. 1994, pp. 1–16.

*Primary Examiner*—Denise L. Ferensic
*Assistant Examiner*—Derek S. Boles
*Attorney, Agent, or Firm*—Jules J. Morris; Terrence Martin; Sean D. Detweiler

[57] ABSTRACT

A control unit and a related method of operation for controlling the temperature of the water circulated in the radiant loop of a hydronic heating system. The control unit includes temperature setting dials that can be used to adjusts the reset curve used to determine the desired secondary, radiant loop water temperature. The control unit generates a linear reset curve between two setpoints such that the control unit can calculate a desired secondary loop water temperature based on the reset curve and the present outdoor air temperature. The control unit monitors the temperature of the water returning to the boiler from both the primary loop and the secondary, radiant loop. The control unit monitors the return water temperature over a first interval and, based on the rate of change in the return water temperature, calculates a predicted return water temperature at a second interval in the future. If the predicted return water temperature is lower than the user-selected minimum return water temperature, the control unit operates the modulating valve to reduce the amount of heated water flowing to the secondary, radiant loop.

21 Claims, 4 Drawing Sheets

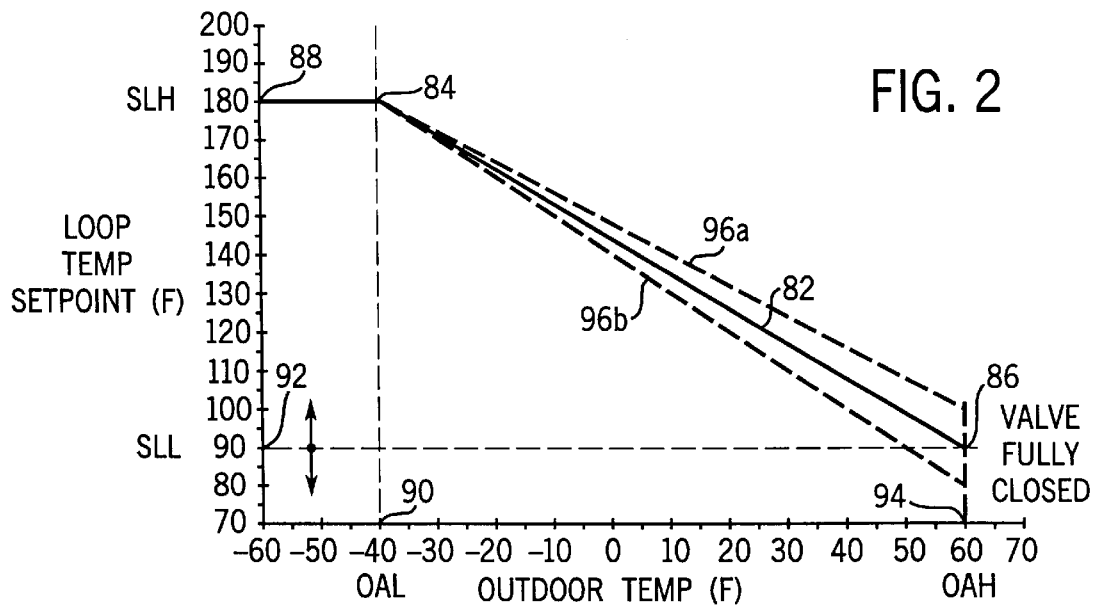
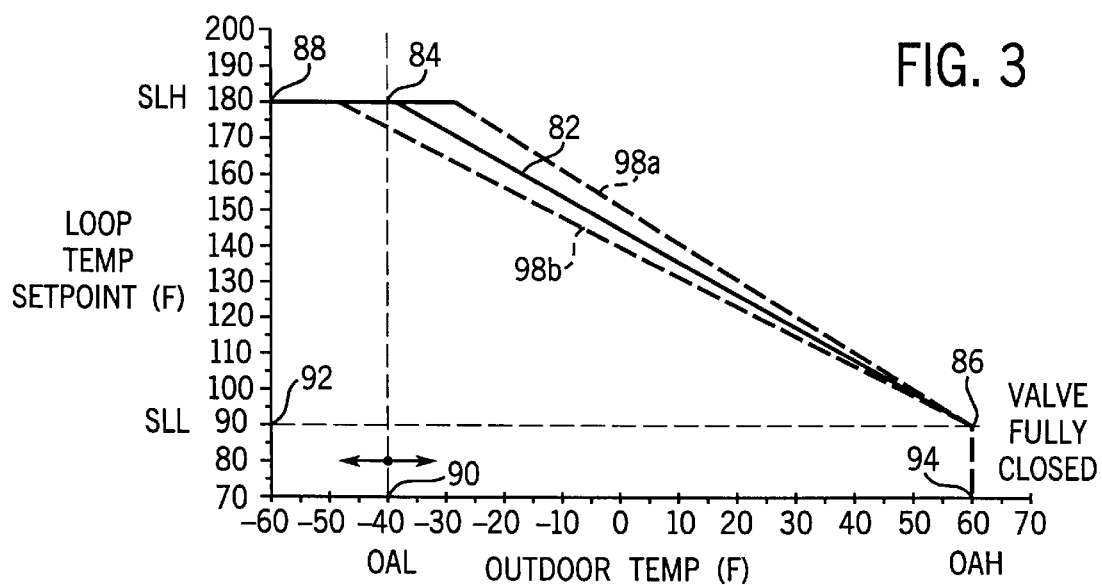

RADIANT HEATING SYSTEM RESET CONTROL

BACKGROUND OF THE INVENTION

The present invention relates to a hydronic heating system. More specifically, the invention relates to a control unit and a method of operating a control unit that controls the temperature of water distributed in a radiant loop of a hydronic heating system having a primary loop, a secondary, radiant loop and a boiler.

Oil and gas fired boilers have long been used to supply hot water for hydronic heating in a building. Conventional hydronic heating systems circulate a supply of heated water through a series of heat exchangers positioned in the individual rooms of the building.

A simple hydronic heating system consists of a single boiler and a circulating pump that are controlled by a control unit that responds to a demand for heat from a single room thermostat. The single room thermostat only allows one temperature to be specified by the homeowner. The temperature in the vicinity of the thermostat will be controlled to the desired level, but in other parts of the house, the temperature can vary widely due to inadequate air distribution, solar radiation entering through outside windows, outside wind, and heat generated by people and other appliances. In response to these problems and the desire for greater comfort and flexibility, zoned heating systems have been developed.

A zoned heating system divides a building into a series of heating zones, each of which has an individual thermostat and flow control means, such as a valve. A zoned heating system is advantageous in that the user can selectively set the temperature in the different heating zones, which results in increased energy savings since the user is able to divert an increased amount of heat into the occupied rooms, while decreasing the amount of heat into rooms that may not be occupied.

In a hydronic heating system incorporating separate heating zones, the heating system often includes a primary loop and a secondary, radiant loop. The primary loop provides a path for heated water leaving the boiler to recirculate through the boiler without passing through any of the heating zones. Thus, the water flowing in the primary loop returns to the boiler at nearly the same temperature as it left the boiler, since little heat is dissipated from the water within the primary loop itself.

The secondary, radiant loop includes the series of heat exchangers positioned in the individual heating zones. Heated water from the boiler is circulated through the heat exchangers in the individual heating zones, such that heat is dissipated from the heated water to provide the required heating for the particular heating zone.

In many hydronic heating systems including both a primary loop and a radiant loop, a modulating valve is positioned between the primary and radiant loops to divert the flow of heated water between the two loops as required. Typically, a mixing controller is utilized to operate the modulating valve in a manner to control the temperature of water in the secondary, radiant loop.

In recent years, several advances have been made to increase the operating efficiencies of hydronic heating systems. For instance, mixing controllers that modify the water temperature in the secondary, radiant loop based on the outdoor air temperature have been developed. For example, one manufacturer offers a mixing controller that adjusts the temperature of the heated supply of water based on the outdoor temperature. Typically, systems like this include a ratio adjustment mechanism that allows the user to adjust the heating curve such that the temperature of the water is raised or lowered a selected amount for each degree of change in the outdoor air temperature. This type of adjustment for the supply water temperature based on the outdoor air temperature is called reset control. As discussed, most mixing controllers generate a heating curve that is adjustable by a ratio adjustment switch, such that the control can be set to adjust the supply water temperature based on the amount of change in the outdoor air temperature. However, this type of adjustment for the reset curve requires training and an understanding of the relationship between the supply water temperature and changing of the reset ratio, since the relationship may not be readily apparent.

In many types of boilers, heated flue gases generated by combustion within the boiler are fed into a heat exchanger surrounded by the supply of water to be heated. The heated flue gases transfer their heat through the heat exchanger and into the supply of stored water, thereby increasing the temperature of the water within the boiler. Often, the heat exchanger is manufactured from a material that is subject to corrosion, such as cast iron. In a hydronic heating system that includes heating zones that rapidly dissipate heat from the heated water circulated through the secondary, radiant loop, the water returning to the boiler from the secondary, radiant loop often is well below the temperature of the water leaving the boiler. If the return water temperature falls below a certain threshold in relationship to the temperature of the heated water, the cold water in the boiler may cause condensation within the heat exchanger, thus creating a possibility for corrosion within the heat exchanger. Some heat exchangers may also be susceptible to cracking if a large volume of cold water is introduced into an already hot heat exchanger (a condition known as thermal shock).

Therefore, it can be appreciated that a hydronic heating system controller that provides accurate and easily understandable reset control, as well as protection against possible condensation and thermal shock in the heat exchanger, would be a desirable improvement in the field of hydronic heating.

SUMMARY OF THE INVENTION

It is an object of the present invention to provide a method of controlling the water temperature in the radiant loop of a hydronic heating system that provides reset control based on a plurality of temperature settings set in a control unit. It is a further object of the invention to provide a method of controlling the water temperature in the radiant loop of a hydronic heating system that monitors the return water temperature to a boiler and decreases the amount of heated water supplied to the secondary, radiant loop if the temperature of the water returning to the boiler would fall below a predefined lower limit within a defined period of time.

The present invention is a method of controlling the water temperature in the radiant loop of a hydronic heating system that modifies the desired temperature in the radiant loop based on the outdoor air temperature and a reset curve. The method of the invention monitors the temperature of the water returning to the boiler in the hydronic heating system and pro-actively prevents the return water temperature from falling below a minimum, user selected temperature.

The method of the invention includes providing a control unit having a microcontroller that is used to monitor and control the temperature of the water within the hydronic heating system. The control unit includes a plurality of temperature dials that allow the user to set various temperatures related to the operation of the hydronic heating system. The control unit includes a pair of temperature dials that allows the user to set a maximum radiant loop water temperature and a minimum radiant loop water temperature. The control unit further includes a pair of temperature dials that allow the user to select a maximum outdoor air temperature and a minimum outdoor air temperature.

Based on the user selected temperature settings, the control unit generates a linear reset curve between a first and a second setpoint. The first setpoint is determined by the minimum outdoor air temperature and the maximum radiant loop water temperature. The second setpoint is determined by the maximum outdoor air temperature and the minimum radiant loop water temperature. After generating the reset curve, the control unit monitors the outdoor air temperature and calculates a desired temperature for the water in the radiant loop based on the reset curve and the current measured outdoor air temperature. After determining the desired temperature for the water in the radiant loop, the control unit operates the hydronic heating system to supply heated water at the desired temperature to the radiant loop.

In a preferred embodiment of the invention, the hydronic heating system includes a primary loop and a secondary, radiant loop. The primary loop and the secondary, radiant loop are interconnected by a modulating valve. The primary loop directs heated water from the boiler through a closed loop and returns the water to the boiler with a minimum amount of heat loss. The heated water is returned to the boiler by a primary return line. The modulating valve is controlled by the control unit such that when the control unit opens the modulating valve, the supply of heated water in the primary loop flows into the secondary, radiant loop.

The secondary, radiant loop includes a plurality of heating zones, each of which includes a heat exchanger. As water is circulated in the secondary, radiant loop, heat is dissipated from the water through one or more of the heat exchangers. The cooled water from the heat exchangers is returned to the boiler through the primary return line. In the primary return line, the cooled water from the secondary, radiant loop mixes with the heated water from the primary loop.

A primary return water temperature sensor is positioned in the primary return line and is coupled to the control unit. The control unit monitors the temperature of the water in the primary return line and, based on two measurements of the primary return line water temperature over a first time interval, predicts the temperature of the water in the primary return line at a second time interval in the future. If the predicted temperature of the water in the primary return line falls below a minimum primary return temperature, the control unit closes the modulating valve a preset amount to reduce the flow of heated water from the boiler to the secondary, radiant loop. In this manner, the control unit prevents the temperature of the water in the primary return line from falling below the minimum primary return water temperature, thereby preventing condensation and thermal shock within the boiler.

In the preferred embodiment of the invention, the control unit includes a setup mode in which the control unit displays the current settings of the plurality of temperature dials. In addition, the control unit displays the current temperature sensed by the outdoor air temperature sensor, the primary return water temperature sensor, and the secondary loop water temperature sensor. While the temperatures set on the plurality of temperature dials are being displayed, the user can adjust the temperature dials while viewing the current setting on a display on the control unit.

The control unit further includes a test mode that permits the user to test a variety of functions of the control unit. For example, when the control unit is in the test mode, the control unit tests the operation of the boiler, the modulating valve, the power supply, the thermostats, and the secondary circulator. When the control unit is in the test mode, the control unit permits the user to test each of these external devices in a convenient manner.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a graph illustrating a heating reset curve for the water in the radiant loop as calculated in accordance with the method of the present invention;

FIG. 3 is a graph illustrating the heating reset curve similar to FIG. 2, showing the change in the reset curve based on the change in one of the preselected temperature values;

DETAILED DESCRIPTION OF THE INVENTION

Figure 1:
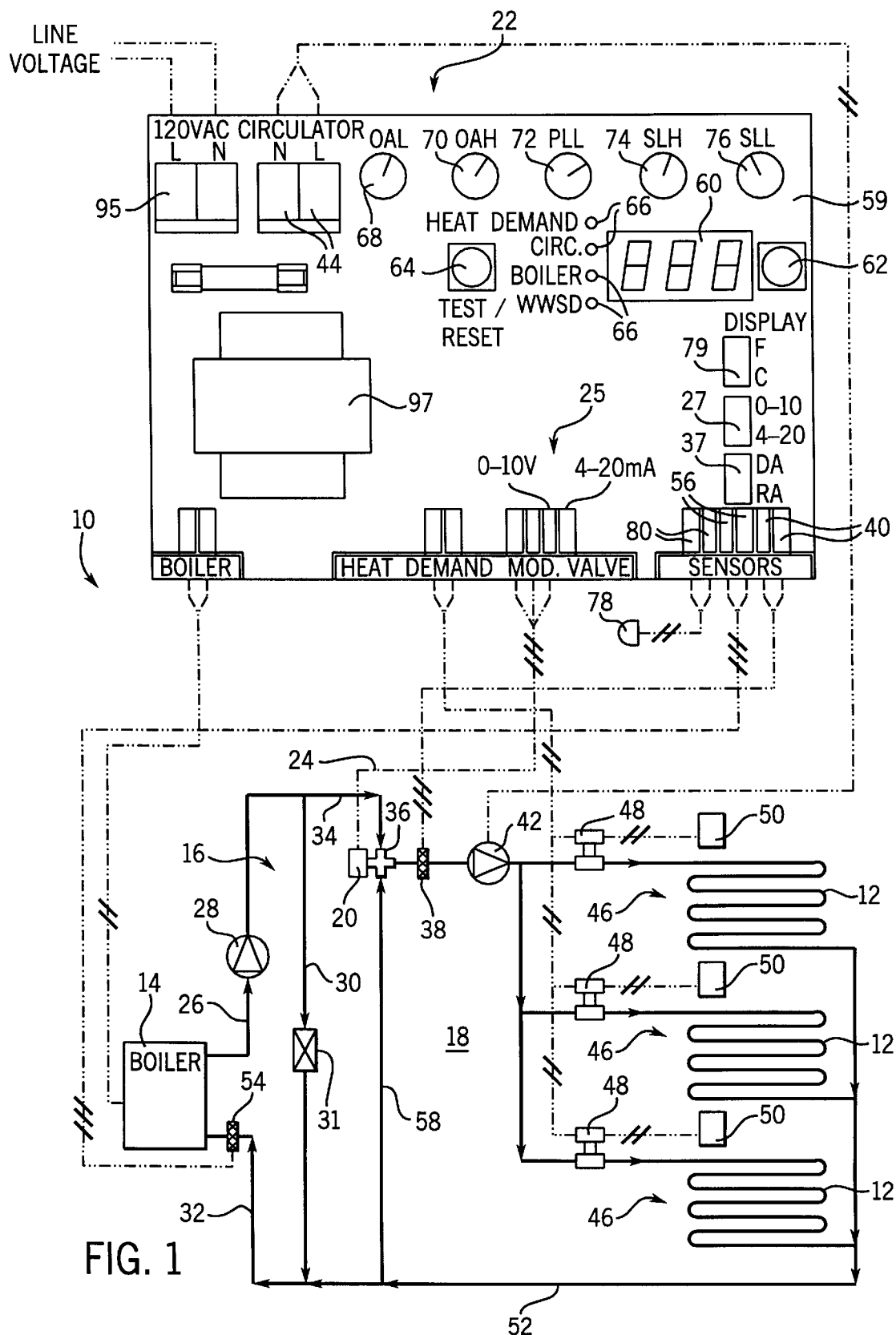
FIG. 1 is a schematic wiring diagram showing the interconnection between the representative components of the hydronic heating system, including a control unit of the present invention, for a building having a plurality of heating zones.

FIG. 1 shows a hydronic heating system 10 that provides heat for a building. The hydronic heating system 10 circulates a supply of heated water through a series of heat exchangers 12 positioned throughout the building. The heat exchangers 12 positioned throughout the building radiate heat from the heated water to warm the interior space of the building to a desired temperature. Thus, through the circulation of heated water, the occupants of the building are able to control the interior temperature.

The hydronic heating system 10 includes a single gas or oil fired boiler 14 that is used to heat the supply of water circulated through the building. The hydronic heating system 10 generally includes a primary loop 16 and a secondary, radiant loop 18. In the preferred embodiment of the invention, the primary loop 16 and the secondary, radiant loop 18 are in fluid communication with each other through a modulating valve 20. Preferably, the modulating valve 20 is a three-way modulating valve, such as Model No. 0747P0295EA00 manufactured and sold by Erie Manufacturing Company, Milwaukee, Wis., although it is understood that any other satisfactory modulating valve may be employed. The position of the valve stem in the modulating valve 20 is controlled by a control unit 22 through a control line 24 and a series of valve terminals 25 contained on the control unit 22. As shown in FIG. 1, the valve terminals 25 include connections for modulating valves operated by either a 4–20 mA or 0–10 volt signal. By simply adjusting a jumper 27 on the control unit 22, the control unit 22 can be configured to operate several types of modulating valves 20. The operation of the control unit 22 to open and close the modulating valve 20 will be described in greater detail below.

Heated water from the boiler 14 flows out through an outlet pipe 26 and is pumped through the primary loop 16 by a primary circulating pump 28. The primary loop 16 further includes a return bypass 30 and a balance valve 31 connected between the outlet of the primary circulating pump 28 and a return line 32. The return line 32 returns water back to the boiler 14 from both the primary loop 16 and the secondary, radiant loop 18. Thus, when the modulating valve 20 is completely closed, thereby cutting off the supply of heated water to the secondary, radiant loop 18, the entire volume of heated water from the boiler 14 is recirculated back to the boiler 14 through the return line 32. Since the primary loop 16 does not include any heat exchangers and is relatively short, very little heat is lost from the heated water within the primary loop 16.

The primary loop 16 is in fluid communication with the modulating valve 20 through a connecting pipe 34. The connecting pipe 34 is coupled to the control port 36 of the modulating valve 20. When the modulating valve 20 is completely closed, the modulating valve 20 prevents the flow of water from the connecting pipe 34 to the secondary, radiant loop 18 while still allowing the water in the secondary, radiant loop 18 to be circulated. In the preferred embodiment of the invention, when the modulating valve 20 is completely open, the heated supply of water from the boiler 14 is able to freely flow through both the connecting pipe 34 and the modulating valve 20 into the secondary, radiant loop 18. The modulating valve 20 is operable between a completely open and a completely closed position, such that the valve stem can be positioned at varying percentages of completely opened or completely closed. The position of the valve stem within the modulating valve 20 is controlled by a control signal generated by the control unit 22. For example, if the control unit 22 is configured to operate the modulating valve with a 0–10 volt signal, a control signal having a magnitude of 3 volts would open the valve 30%. The control unit 22 also includes a jumper 37 that allows the valve to be direct acting (0 volts closed/10 volts open) or reverse acting (0 volts open/10 volts closed).

The secondary, radiant loop 18 includes a secondary loop water temperature sensor 38 that is coupled to secondary loop terminals 40 on the control unit 22. Through the secondary loop water temperature sensor 38, the control unit 22 can monitor the temperature of the water being circulated through the secondary, radiant loop 18. The heated water within the secondary, radiant loop 18 is circulated by a secondary circulating pump 42. The secondary circulating pump 42 is coupled to a pair of terminals 44 contained on the control unit 22, such that the control unit 22 can operate the secondary circulating pump 42.

The secondary, radiant loop 18 includes a plurality of heating zones 46, each of which includes a valve 48, a thermostat controller 50 and a heat exchanger 12. Each of the valves 48 and thermostats 50 is connected to the control unit 22 such that when one of the heating zones 46 requires heat, the thermostat 50 operates the valve 48 for the heating zone 46 calling for heat to provide heated water to the corresponding heat exchanger 12. In this manner, each of the heating zones 46 can be independently heated and controlled through its own individual thermostat 50 and valve 48.

After the heated water has passed through one of the heat exchangers 12 and has dissipated heat to raise the temperature in the heating zone 46, the cooled water passes through a secondary return line 52. The secondary return line 52 returns the cooled water to the return line 32, where the cooled water is mixed with the heated water leaving the primary loop 16. A return water temperature sensor 54 is positioned within the return line 32 and is connected to terminals 56 on the control unit 22, such that the control unit 22 can monitor the temperature of the water returning to the boiler through the return water temperature sensor 54.

As can be understood in FIG. 1, when the modulating valve 20 is completely closed, the entire amount of heated water leaving the boiler 14 through the outlet pipe 26 is circulated by the primary circulating pump 28 only through the primary loop 16. As the modulating valve 20 begins to open, a portion of the heated water in the primary loop 16 is diverted into the secondary, radiant loop 18. As the heated water passes through the secondary, radiant loop 18, heat is dissipated from the water through one of the heat exchangers 12, such that the temperature of the water drops. The lower temperature water in the secondary return line 52 mixes with the heated water from the primary loop 16, such that the temperature of the water in the return line 32 decreases. As the modulating valve 20 continues to open, a greater portion of the heated water from the boiler 14 is diverted through the secondary, radiant loop 18. If the secondary, radiant loop 18 is dissipating a large amount of heat, such as when the heating zones 46 require a large amount of heating, the temperature of the water in the return line 32 can decrease significantly from the temperature of the water leaving the boiler 14. The control unit 22 monitors the temperature in the return line 32 through the return water temperature sensor 54 and operates the modulating valve 20 to close the valve if the water temperature in the return line 32 falls below a lower limit, as will be described in greater detail below.

The control unit 22 also controls the temperature of the water in the second, radiant loop 18 through the operation of the modulating valve 20. If the temperature of the water in the secondary loop 18 needs to be increased, the control unit 22 opens the modulating valve 20 further, such that a larger amount of heated water is diverted from the primary loop 16. As the modulating valve 20 opens, the valve not only increases the amount of heated water flowing through the connecting pipe 34, but the modulating valve 20 also decreases the amount of water flowing through the modulating valve 20 from the secondary loop valve return line 58. Thus, the temperature of the water circulated in the secondary, radiant loop 18 increases, as sensed by the secondary loop water temperature sensor 38.

The control unit 22 generally functions to control the temperature of the water circulating in the secondary, radiant loop 18, while at the same time monitoring the temperature of the water returning to the boiler 14 to prevent condensation and thermal shock within the boiler 14 in a method to be described below. The control unit 22 includes a microcontroller (not shown) that is programmed to operate in the method to be described in detail below. In the preferred embodiment of the invention, the control unit 22 includes a microcontroller, Model No. PlC16C74A-04\P, available from Microchip Technology Inc., Chandler, Ariz. The control unit 22 generally includes a display panel 59 having a three-digit LED display 60 that is used to display a variety of temperatures and other settings important in the operation of the hydronic heating system 10, as will be described in detail below.

The control unit display panel 59 further includes a display button 62. When the display button 62 is depressed, the user is able to toggle between various possible outputs on the display 60. The control unit display panel 59 further includes a test/reset button 64 that allows the user to test a variety of functions of the control unit 22 during setup. A series of LEDs 66 contained on the display panel 59 of the control unit 22 indicates various operating characteristics currently present in the hydronic heating system 10.

The control unit display panel 59 includes a plurality of adjustable temperature setting dials that allow the user to adjust the reset curve for the water temperature in the secondary, radiant loop 18. As previously discussed, the reset feature allows the control unit 22 to adjust the desired temperature for the water in the secondary, radiant loop 18 based on the outdoor air temperature. The display panel 59 of the control unit 22 includes an outdoor air low temperature dial 68, and outdoor air high temperature dial 70, a primary loop low temperature dial 72, a secondary loop high temperature dial 74, and a secondary loop low temperature dial 76. The outdoor air low temperature dial 68 includes visual markings corresponding to a range of possible temperatures for the geographic area. In the preferred embodiment of the invention, the outdoor air low temperature dial has settings at 10 degree increments between −60° F. and 40° F.

The outdoor air high temperature dial 70 has a series of visual markings at 5 degree increments ranging between 40° F. and 70° F. The outdoor air high temperature dial 70 is used to set the warm weather shutdown temperature, which is the temperature at which the control unit 22 completely closes the modulating valve 20, such that the hydronic heating system does not provide any heated water flow to the building. This feature, often called "warm weather shutdown", allows the hydronic heating system 10 to conserve energy when the outdoor air temperature has reached a temperature at which internal heating of the building is no longer required. The primary loop low temperature dial 72 has a series of visual markings at 10 degree increments ranging between 60° F. and 150° F., along with a cold start setting. The primary loop low temperature dial 72 allows the user to input a temperature into the control unit 20 which is the minimum allowable temperature of the water returning to the boiler 14 through the return line 32. This temperature usually corresponds to the manufacturer's suggestion for the particular boiler 14 being utilized.

In addition to the possible temperature settings, the primary loop low temperature dial 72 includes a cold start setting, such that the user can allow the primary return temperature to fall as low as the secondary loop return temperature. This feature is particularly desirable when the boiler 14 is a non-condensing boiler that allows the primary return water temperature to fall as low as the secondary loop return temperature when one of the zones within the hydronic heating system 10 first calls for heat. As previously discussed, in other types of boilers 14, if the return water temperature falls below a manufacture-designated minimum, condensation or thermal shock is possible within the heat exchanging coils, which can then cause corrosion or cracking of the heat exchanger. The control unit 22 of the present invention operates to prevent condensation and thermal shock within the boiler by preventing the water in the return line 32 from falling below the primary loop low temperature setting. The manner in which the control unit 22 functions to prevent the return water temperature from falling below the primary loop low temperature setting on dial 72 will be discussed in detail below.

The secondary loop high temperature dial 74 includes a series of visual markings at 10 degree increments ranging between 90° F. and 200° F. The secondary loop high temperature dial 74 is used to select the maximum radiant loop water temperature when the outdoor air temperature is at the lowest possible setting on outdoor air low temperature dial 68.

The secondary loop low temperature dial 76 includes a series of visual markings at 5 degree increments ranging between 70° F. and 110° F. The secondary loop low temperature dial 76 is used to select the minimum radiant loop water temperature desired when the outdoor air temperature is near the warm weather shutdown point. A typical setting for the secondary loop low temperature dial is approximately 90° F.

The control unit 22 further includes an outdoor air temperature sensor 78 connected to the control unit 22 through a pair of terminals 80. Through the outdoor air temperature sensor 78, the control unit 22 is able to monitor the outdoor air temperature. Preferably, the outdoor air temperature sensor 78 is positioned outside the building along a shaded north-facing wall above the snow line.

The operation of the control unit 22 in controlling the hydronic heating system 10 will now be discussed in greater detail. Initially, the control unit 22 is mounted in the desired position, such as on a wall near the three-way modulating valve 20. After the control unit 22 has been mounted, the outdoor air sensor 78, the secondary loop water temperature sensor 38, and the return water temperature sensor 54 are positioned in the proper location and connected to the correct terminals on the control unit 22. Once the three individual sensors have been connected to the control unit 22, individual jumpers on the display face 59 of the control unit 22 are set. In the preferred embodiment of the invention, the display panel 59 includes a jumper 79 for the desired temperature scale (F or C), a jumper 27 for the valve control signal (0–10 V or 4–20 mA) and a jumper 37 for the valve action (direct or reverse acting).

After the proper sensor connections and jumper settings have been made for the control unit 22, the temperature dials 68–76 are then set. As was previously discussed, the temperatures set by the user on the temperature dials 68–76 are used by the control unit 22 to generate a reset curve 82, as is shown in FIGS. 2 and 3. The reset curve 82, along with the current outdoor air temperature, is used to determine the desired temperature for the water in the secondary, radiant loop 18. Thus, as the outdoor air temperature increases, the desired temperature for the water in the secondary, radiant loop 18 decreases.

Referring now to FIG. 2, in the preferred embodiment of the invention, the reset curve 82 is a straight line extending between a first setpoint 84 and a second setpoint 86. The first setpoint 84 is determined by a maximum secondary loop water temperature 88 as set by the secondary loop high temperature dial 74 and a minimum outdoor air temperature 90 as set by the outdoor air low temperature dial 68. As can be seen in FIG. 2, when the reset curve 82 reaches the minimum outdoor air temperature 90, the desired temperature of the water in the secondary, radiant loop 18 remains constant at the maximum secondary loop water temperature 88.

The second setpoint 86 is determined by the a minimum secondary loop water temperature 92 as set by the secondary loop low temperature dial 76 and a maximum outdoor air temperature 94 as set by the outdoor air high temperature dial 70. As can be seen in FIG. 2, when the outdoor air temperature reaches the maximum outdoor air temperature 94, the modulating valve 20 is completely closed and the secondary circulator 42 turned off since no heat is required in the secondary, radiant loop 18.

As can be understood in FIGS. 2 and 3, the reset curve 82 is used by the controller 22 to determine the desired temperature of the water in the secondary, radiant loop 18 based on the measured outdoor air temperature. As the outdoor air temperature decreases, the desired temperature of the water in the secondary, radiant loop 18 increases, thereby providing an increased amount of available heat to the building. Likewise, as the outdoor air temperature increases, the desired temperature for the water in the secondary, radiant loop 18 decreases.

Referring again to FIG. 2, the phantom lines 96a and 96b illustrate the movement of the reset curve 82 as the secondary loop low temperature dial 76 is adjusted. If the minimum secondary loop water temperature 92 is increased, the reset curve 82 shifts to the phantom line 96a. Likewise, if the minimum secondary loop water temperature 92 is decreased, the reset curve 82 shifts to phantom line 96b.

FIG. 3 is similar to FIG. 2 and shows the movement of the reset curve 82 as the minimum outdoor air temperature 90 is adjusted. If the minimum outdoor air temperature 90 is increased, the reset curve 82 shifts to the reset curve 98a such that the water in the secondary, radiant loop 18 reaches the maximum secondary loop temperature 88 at a warmer outdoor air temperature. Decreasing the minimum outdoor air temperature 90 results in a shift of the reset curve to 98b, at which time the temperature of the water in the secondary, radiant loop 18 reaches the maximum secondary loop temperature 88 at a colder outdoor air temperature. As can be understood by studying FIGS. 2 and 3, the reset curve 82 can be easily modified by adjusting the temperature settings 88–94 without having to make any calculations or trying to understand complex visual representations as is the case in many currently available reset controllers.

Although the generation of the reset curve 82 has been described for a hydronic heating system 10 having both a primary loop 16 and a secondary, radiant loop 18, it should be understood that generating a reset curve 82 according to the method identified above would be applicable in a hydronic heating system having any number of loops. In a hydronic system having any number of loops, the control unit 22 could operate the primary circulator 28 and the boiler 14 to provide heated water in the radiant loop at a temperature determined by the reset curve 82. Alternatively, multiple control units 22 could each operate a secondary circulator 42 and a modulating valve 36 in one of several radiant loops to provide individual control in each radiant loop.

After the desired temperature settings have been made as discussed above, 120 VAC power is supplied to a power terminal 95 on the control unit 22. The control unit 22 further includes a transformer 97 that converts the 120 VAC power supply to a DC voltage. Upon power being supplied to the control unit 22, the microcontroller in the control unit 22 enters a power-up/setup display sequence. During the power-up/setup display sequence, the microcontroller displays the current settings of the control unit 22 on the display 60. Upon entering the power-up/setup display sequence, the control unit 22 automatically scrolls through the current settings. Alternatively, the user can manually scroll through the settings by depressing the display button 62 after each setting has been reviewed.

Initially, the control unit 22 first displays the temperature scale selected by the user through the jumper 79 on the control unit display panel 59. The display 60 is lighted to indicate either Fahrenheit or Celsius. After displaying the temperature scale, the control unit 22 displays the control signal output range, which is either 0–10 volts or 4–20 mA, depending upon the jumper 27 set by the user. Next, the control unit 22 displays the valve action, which is either direct acting or reverse acting and is again user selectable through the jumper 37 on the display panel 59.

After displaying the valve action, the control unit 22 next displays the five temperatures set on the dials 68–76. In the preferred embodiment of the invention, each of the temperature dials 68–76 is a variable resistance potentiometer. Typically, potentiometers are rather imprecise devices and can vary greatly from one potentiometer to the next. In the preferred embodiment of the invention, each of the temperature dials 68–76 is a +/–20% potentiometer. Initially, the setting of the outdoor air low temperature dial 68 is shown on the display 60. While the temperature setting is being displayed, the user can adjust the outdoor air low temperature dial 68 until the temperature shown on the display 60 reaches the temperature the user desires. After the outdoor air low temperature dial 68 has been correctly set, the user can depress the display button 62 such that the temperature set by the outdoor air high temperature dial 70 is now displayed. This process is repeated until each of the temperature dials 68–76 has been fine tuned by the user. This feature of the control unit 22 is particularly desirable, since it allows the user to receive feedback on the precise setting of each of the temperature dials 68–76 without having to rely on the indicator printed on each of the temperature dials.

After the setting for each of the temperature dials 68–76 has been displayed and fine tuned if required, the control unit 22 next displays the current outdoor air temperature as measured by the outdoor air temperature sensor 78. In addition to displaying the current outdoor air temperature, the control unit 22 will display an error message if the sensor is improperly connected or malfunctioning.

After displaying the current outdoor air temperature, the control unit 22 next displays the current primary loop temperature as measured by the return water temperature sensor 54. In addition to displaying the current temperature, the control unit 22 will display an error message if the sensor 54 has been improperly connected or is malfunctioning.

Finally, the control unit 22 displays the current secondary loop temperature as measured by the secondary loop water temperature sensor 38. In addition to displaying the current temperature, the control unit 22 displays an error message if the secondary loop water temperature sensor 38 is improperly connected or is malfunctioning. After displaying the current secondary loop water temperature, the control unit 22 enters the run mode, as will be discussed.

In addition to the power-up/setup mode, the microcontroller in the control unit 22 also can be operated in a test mode. The test mode is activated by simultaneously holding down the display button 62 and pressing the test/reset button 64. Upon entering the test mode, the control unit 22 first tests the display 60 by activating every LED sequence in the display 60. If the display 60 is operating correctly, the user can then depress the display button 62 to advance the testing sequence. In the next step of the testing sequence, the control unit 22 displays the supply voltage value being received by the control unit 22. If the supply voltage is within the desired range, the user can depress the display button 62 to continue the test mode.

In the next step in the test mode, the control unit 22 tests the thermostat input. When the thermostat input is being tested, the control unit 22 activates the LED 66 corresponding to the heat demand indicia. After testing the thermostat, the control unit 22 turns on the secondary circulator 42 and the corresponding LED 66. If the secondary circulator 42 is operating properly, the user can depress the display button 62, causing the control unit 22 to activate the boiler through the boiler terminal 100. At the same time, the control unit 22 activates the LED 66 next to the boiler indicia.

In the next step in the test mode sequence, the control unit 22 activates the outdoor air cut off and lights the LED 66 next to the warm water shut off indicia. Finally, the control unit 22 operates the modulating valve 20 between a completely open and a completely closed position. The control unit 22 continues to move the modulating valve 20 between the open and closed positions until the display button 62 has been again depressed. After completing the test mode display sequence, the control unit 22 returns to the power-up/setup display sequence before entering the run mode. By incorporating the test mode into the control unit 22, the control unit 22 can easily test each of the components connected to it upon the user's request.

After executing the power-up/setup display sequence, the control unit 22 enters into the run mode. During the run mode, the control unit 22 continuously loops between displaying the current outdoor temperature, the current primary loop temperature as measured by the return water temperature sensor 54, the desired temperature of the water in the secondary, radiant loop 18 as calculated through the reset curve 82, and the current secondary loop water temperature measured by the secondary loop temperature sensor 38.

Upon entering the run mode, the control unit 22 initially checks the power supply voltage to determine whether adequate power is available for operation. If the power supply is low, the control unit 22 activates the display 60 to indicate low power. If adequate power is available, the control unit 22 next reads the inputs from the outdoor air temperature sensor 78, the return water temperature sensor 54, the secondary loop water temperature sensor 38, and any heat demand signal from each of the thermostats 50.

If any of the thermostats 50 are calling for heat, the control unit 22 will activate the secondary circulator 42. As the secondary circulator 42 begins to operate, water in the secondary, radiant loop 18 is circulated through the heating zone 46 calling for heat. As the water continues to circulate in the secondary, radiant loop 18, the control unit 22 monitors the temperature of the water in the secondary, radiant loop 18 through the secondary loop water temperature sensor 38. If the water temperature in the secondary, radiant loop 18 falls below the desired secondary loop water temperature calculated by the control unit 22 through use of the reset curve 82 and the current outdoor air temperature, the control unit 22 opens the modulating valve 20 to increase the amount of heated water passing between the primary loop 16 and the secondary, radiant loop 18. Initially, the control unit 22 does not operate the boiler 14 since the heated supply of water already contained in the primary loop 16 may be sufficient to satisfy the heat demand without any further heating by the boiler 14. The control unit 22 controls the position of the valve stem in the modulating valve 20 through proportional-integral control as is well known in the industry.

If the water temperature in the secondary, radiant loop 18 remains below the desired secondary loop water temperature calculated by the reset curve, the control unit 22 will continue to open the modulating valve 20 until the modulating valve 20 is at least 50% open. Once the modulating valve 20 is at least 50% open, the control unit 22 will activate the boiler 14. When the boiler 14 is activated, the temperature of the water leaving the boiler 14 and passing through the modulating valve 20 will increase. Eventually, the temperature of the water in the secondary, radiant loop 18 will reach the desired secondary loop water temperature such that the control unit 22 will begin to close the modulating valve 20. The boiler 14 will remain activated until the modulating valve 20 closes off to 30% open, at which time the boiler output will then be turned off by the control unit 22. In any event, the boiler output will not turn off until it has been on for at least 5 minutes to prevent short-cycling.

During operation of the hydronic heating system 10 as discussed above, the control unit 22 continuously monitors the temperature of the water returning to the boiler through the return line 32 by monitoring the return water temperature sensor 54. If the temperature of the water returning to the boiler falls to the minimum primary loop water temperature set by the primary loop low temperature dial 72, the control unit 22 will close the modulating valve 20 by a predetermined amount. In the preferred embodiment of the invention, the control unit 22 will close the modulating valve 20 by 5% increments every 10 seconds until the temperature measured by the return water temperature sensor 54 is above the minimum primary loop water temperature.

Figure 4:
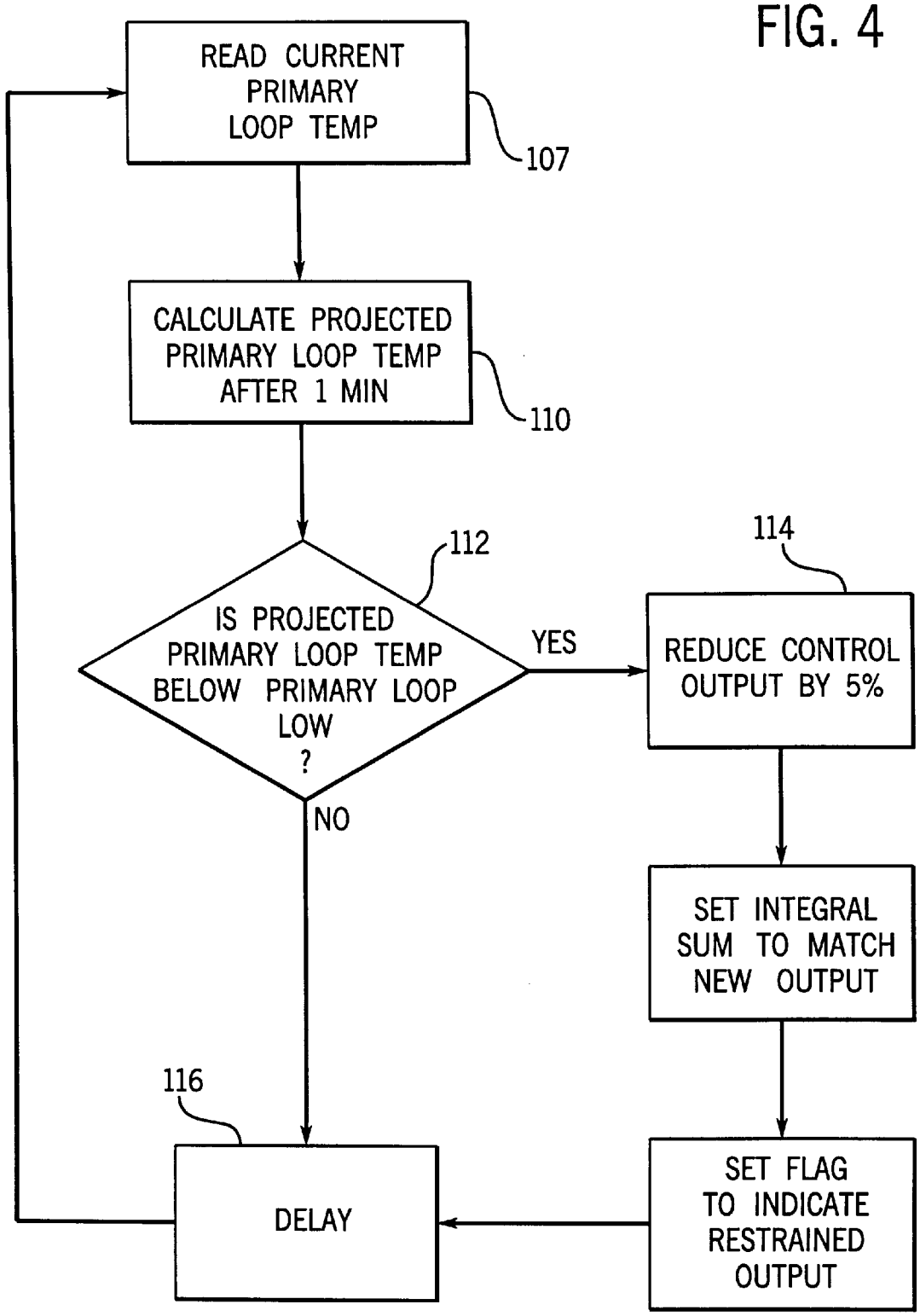
FIG. 4 is a flow diagram illustrating the method of anticipating the return water temperature in accordance with the method of the present invention.
Figure 5:
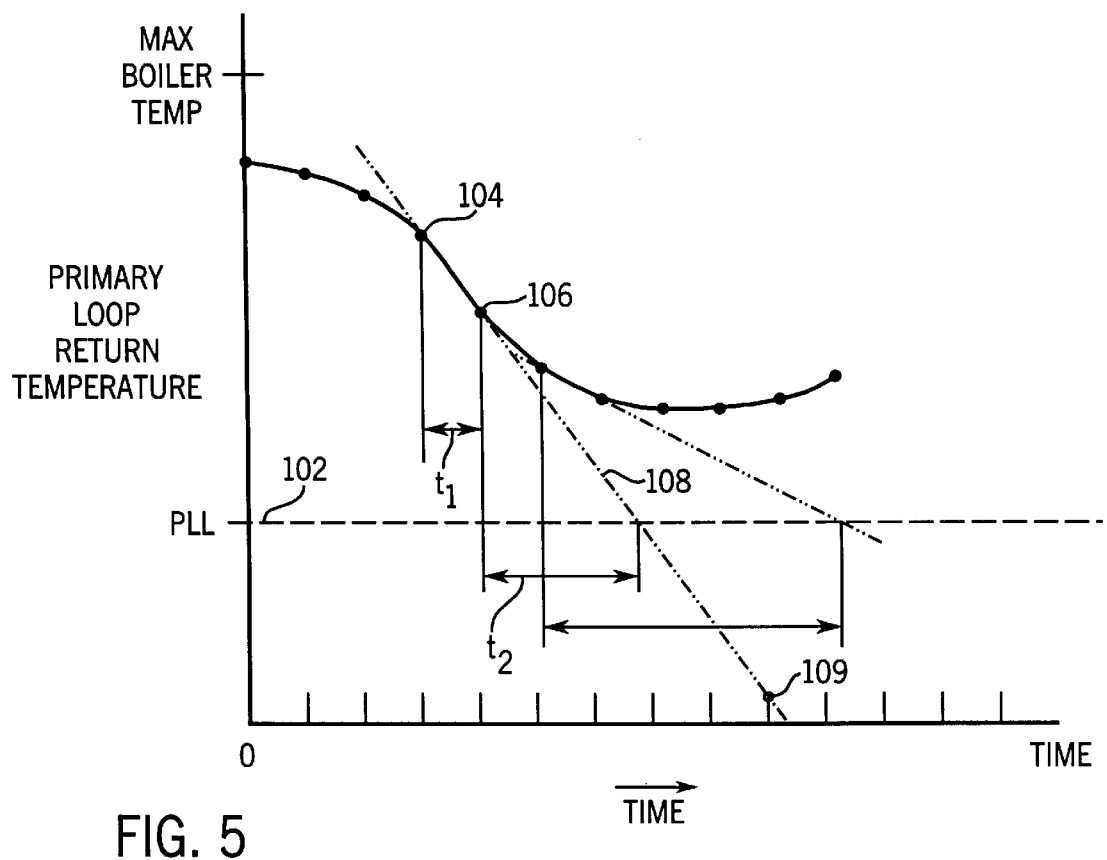
FIG. 5 is a graph illustrating the method of anticipating the return water temperature in accordance with the method of the present invention.

In addition to closing the modulating valve 20 if the return water temperature sensor 54 reading falls below the minimum primary loop water temperature, the control unit 22 operates pro-actively to prevent the return water temperature from ever falling below the minimum primary loop water temperature in a method as illustrated in FIGS. 4 and 5. To anticipate when the return water temperature will fall below the minimum primary loop water temperature, the control unit 22 predicts the temperature of the water in the return line 32 at some point in the future and closes the modulating valve 20 if this predicted return water temperature is below the user-set minimum primary loop water temperature, as shown by reference numeral 102 in FIG. 5.

Initially, the control unit 22 records a first measurement 104 and a second measurement 106 from the return water temperature sensor 54 as shown by step 107 in FIG. 4. As shown in FIG. 5, the first and second measurements 104 and 106 are separated by a first predefined time interval $t_1$, with the second temperature 106 being the present temperature of the water in the return line 32. In the preferred embodiment of the invention, the first time interval $t_1$ is 10 seconds. Based on the present measurement 106 from the return water temperature sensor 54 and the measurement 104 taken 10 seconds earlier, the control unit 22 calculates the slope of a line 108 passing through these two points. The control unit 22 then calculates a predicted return water temperature 109 at a second time interval in the future based on the current temperature measurement 106 and the line 108, as represented by step 110 in FIG. 4. In the preferred embodiment of the invention, the second time interval is set at 1 minute. Thus, every 10 seconds the control unit 22 predicts whether the water temperature in the return line 32 will fall below the minimum primary loop water temperature 102 in the next one minute interval. If the control unit 22 determines in step 112 that the predicted return water temperature 109 in the return line 32 will fall below the minimum primary loop water temperature 102 in less than one minute, the control unit 22 closes the modulating valve 20 by 5% as shown in step 114.

After a 10-second delay 116, the control unit 22 continues to close the modulating valve by 5% increments until the predicted primary loop water temperature 109 will no longer fall below the minimum primary loop water temperature 102 within the second time interval. By retarding the opening of the modulating valve 20, a greater amount of water is recirculated through the primary loop 16, thereby increasing the temperature of the water in the return line 32.

Once the control unit 22 determines that the temperature of the water in the return line 32 will exceed the primary loop low temperature setting 102 within the second time interval, the control unit 22 begins to operate the modulating valve 20 in the normal manner described previously. By anticipating the temperature of the water in the return line 32 and preventing the water temperature from falling below the minimum primary loop water temperature 102, the control unit 22 is able to take proactive steps to prevent condensation and thermal shock within the heat exchanger.

Various alternatives and embodiments are contemplated as being within the scope of the following claims particularly pointing out and distinctly claiming the subject matter regarded as the invention.

We claim:

1. A hydronic heating system including a main boiler and a circulating pump for circulating a supply of heated water between a primary loop and a secondary, radiant loop coupled to the primary loop by a modulating valve, the system comprising:
   a control unit in communication with the modulating valve to control the amount of heated water to the secondary, radiant loop, wherein the control unit comprises:
      a maximum radiant loop water temperature dial used to set a maximum radiant loop water temperature;
      a minimum radiant loop water temperature dial used to set a minimum radiant loop water temperature;
      a maximum outdoor air temperature dial used to set a maximum outdoor air temperature; and
      a minimum outdoor air temperature dial used to set a minimum outdoor air temperature;
   wherein the control unit calculates a linear reset curve based on the maximum radiant loop water temperature, the minimum radiant loop water temperature, the maximum outdoor air temperature, and the minimum outdoor air temperature and operates the modulating valve to control the temperature of the water in the secondary, radiant loop based on the calculated linear reset curve.

2. The hydronic heating system of claim 1 further comprising a minimum primary loop water temperature dial contained on the control unit for setting the minimum water temperature for the water returning to the boiler, wherein the control unit monitors the rate of change in the return water temperature and calculates a predicted return water temperature based on the rate of change, such that the control unit closes the modulating valve when the predicted return water temperature falls below the minimum water temperature.

3. The hydronic heating system of claim 1 further comprising an outdoor air temperature sensor coupled to the control unit for measuring the outdoor air temperature, wherein the control unit calculates a desired temperature for the water in the secondary, radiant loop based on the reset curve and the outdoor air temperature.

4. A hydronic heating system including a main boiler and a circulating pump for circulating a supply of heated water, the hydronic heating system heating a plurality of heating zones, the system comprising:
   a primary loop positioned between an output of the boiler and a return line for returning water to the boiler;
   a secondary, radiant loop coupled to the output of the boiler for circulating the supply of heated water to a plurality of heat exchangers for heating the plurality of heating zones;
   a modulating valve positioned between the primary loop and the secondary, radiant loop, the modulating valve being operable to mix varying amounts of heated water from the primary loop and return water from the secondary, radiant loop;
   a control unit in communication with the modulating valve to control the amount of heated water from the boiler to the secondary, radiant loop;
   a maximum radiant loop water temperature dial contained on the control unit for setting a maximum radiant loop water temperature in the control unit;
   a minimum radiant loop water temperature dial contained on the control unit for setting a minimum radiant loop water temperature in the control unit;
   a maximum outdoor air temperature dial contained on the control unit for setting a maximum outdoor air temperature in the control unit;
   a minimum outdoor air temperature dial contained on the control unit for setting a minimum outdoor air temperature in the control unit;
   an outdoor air temperature sensor coupled to the control unit for measuring the outdoor air temperature;
   a secondary loop water temperature sensor positioned in the secondary, radiant loop and coupled to the control unit for measuring the water temperature in the radiant loop; and
   a return water temperature sensor positioned in the return line and coupled to the control unit for measuring the water temperature in the return line;
   wherein the control unit calculates a linear reset curve based on the maximum radiant loop water temperature, the minimum radiant loop water temperature, the maximum outdoor air temperature, and the minimum outdoor air temperature and determines a desired temperature for the water in the secondary, radiant loop based on the linear reset curve and the measured outdoor air temperature.

5. The hydronic heating system of claim 4 further comprising a minimum primary loop water temperature dial contained on the control unit for setting the minimum water temperature in the return line, wherein the control unit monitors the rate of change in the return water temperature and calculates a predicted return water temperature, such that the control unit closes the modulating valve when the predicted return water temperature falls below the minimum water temperature.

6. A method of controlling the water temperature in a hydronic heating system that circulates a supply of heated water from a boiler to a radiant loop including a plurality of heating zones, the method comprising the steps of:
   providing a control unit;
   setting a maximum radiant loop water temperature and a minimum radiant loop water temperature in the control unit;
   setting a minimum outdoor air temperature and an maximum outdoor air temperature in the control unit; and
   coupling a sensor that measures the outdoor air temperature to the control unit;
   generating a reset curve in the control unit based on the maximum radiant loop water temperature, the minimum radiant loop water temperature, the maximum outdoor air temperature, and the minimum outdoor air temperature;

determining a desired temperature for the water in the radiant loop based on the reset curve and the current measured outdoor air temperature; and operating the hydronic heating system to supply heated water at the desired temperature to the radiant loop.

7. The method of claim 6 further comprising the step of including a valve between the boiler and the radiant loop such that the control unit operates the valve to control the flow of heated water from the boiler to the radiant loop.

8. The method of claim 7 further comprising the step of positioning a radiant loop water temperature sensor in the radiant loop to measure the temperature of the water in the radiant loop.

9. The method of claim 8 wherein the control unit opens the valve to increase the flow of heated water from the boiler to the radiant loop when the measured radiant loop water temperature is below the desired radiant loop water temperature and closes the valve to decrease the flow of heated water from the boiler to the radiant loop when the measured radiant loop water temperature is above the desired radiant loop water temperature.

10. The method of claim 6 wherein the reset curve is generated by creating a linear curve based on a first setpoint determined by the maximum radiant loop water temperature and the minimum outdoor air temperature and a second setpoint determined by the minimum radiant loop water temperature and the maximum outdoor air temperature.

11. A method of controlling the water temperature in a secondary, radiant loop of a hydronic heating system having a boiler and a primary loop, the method comprising the steps of:

providing a control unit;

controlling the operation of a modulating valve positioned between the radiant loop and the primary loop, the modulating valve controlling the flow of heated water from the boiler to the radiant loop;

receiving a measured radiant loop water temperature in the control unit from a radiant loop water temperature sensor positioned in the radiant loop;

receiving a measured outdoor air temperature in the control unit from an outdoor air temperature sensor positioned to measure the outdoor air temperature;

setting a maximum radiant loop water temperature and a minimum radiant loop water temperature in the control unit;

setting a minimum outdoor air temperature and a maximum outdoor air temperature in the control unit;

generating a reset curve in the control unit based on the maximum and minimum radiant loop water temperatures and the maximum and minimum outdoor air temperature;

determining a desired radiant loop water temperature for the water in the radiant loop based on the reset curve and the measured outdoor air temperature; and operating the modulating valve to control the flow of water from the boiler to the radiant loop such that the measured radiant loop water temperature is equal to the desired radiant loop water temperature.

12. The method of claim 11 further including the step of operating the modulating valve to mix a desired amount of heated water from the boiler and the radiant loop.

13. The method of claim 12 wherein the step of operating the modulating valve comprises opening the modulating valve to increase the flow of heated water from the boiler to the radiant loop when the measured radiant loop water temperature is below the desired radiant loop water temperature, and closing the modulating valve to decrease the flow of heated water from the boiler to the radiant loop when the measured radiant loop water temperature is above the desired radiant loop water temperature.

14. The method of claim 11 wherein the reset curve is generated by creating a linear curve between a first setpoint determined by the maximum radiant loop water temperature and the minimum outdoor air temperature and a second setpoint determined by the minimum radiant loop water temperature and the maximum outdoor air temperature.

15. The method of claim 11 further comprising the steps of:

positioning a return water sensor to measure the temperature of the water returning to the boiler from the primary loop and the radiant loop;

setting a minimum return water temperature in the control unit;

monitoring for changes in the return water temperature;

calculating a predicted return water temperature based on the rate of change in the return water temperature; and partially closing the modulating valve to decrease the flow of heated water from the boiler to the radiant loop when the predicted return water temperature is below the minimum return water temperature.

16. The method of claim 15 wherein the change in the return water temperature is monitored over a first time interval.

17. The method of claim 16 wherein the predicted return water temperature is calculated at a second time interval in the future based on the rate of change in the return water temperature calculated during the first time interval.

18. A method of controlling the water temperature in a secondary, radiant loop of a hydronic heating system having a boiler and a primary loop, the method comprising the steps of:

providing a control unit;

controlling the operation of a modulating valve positioned between the radiant loop and the primary loop, the modulating valve controlling the flow of heated water from the boiler to the radiant loop;

receiving a signal from a return water temperature sensor that measures a current return water temperature of the water returning to the boiler from the primary loop and the radiant loop;

setting a minimum return water temperature in the control unit;

determining the rate of change in the return water temperature;

calculating a predicted return water temperature based on the rate of change in the return water temperature and the current return water temperature; and partially closing the modulating valve to decrease the flow of heated water form the boiler to the radiant loop when the predicted return water temperature is below the minimum return water temperature.

19. The method of claim 18 wherein the rate of change in the return water temperature is determined over a first time interval.

20. The method of claim 19 wherein the predicted return water temperature is calculated at a second time interval in the future based on the rate of change in the return water temperature calculated during the first time interval and the current return water temperature.

21. The method of claim 20 wherein the second time interval is a multiple of the first time interval.

* * * * *